US006813247B1

(12) United States Patent
Hassan

(10) Patent No.: US 6,813,247 B1
(45) Date of Patent: *Nov. 2, 2004

(54) TRAFFIC REPORTING SYSTEM AND METHOD OVER WIRELESS COMMUNICATION SYSTEMS

(75) Inventor: Kafi Ibrahim Hassan, Randolf, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,893

(22) Filed: Jul. 30, 1999

(51) Int. Cl.[7] .................................................. H04J 1/16
(52) U.S. Cl. ........................ 370/252; 370/328; 455/422
(58) Field of Search ......................... 345/349; 342/450; 370/328, 252, 386, 390; 701/117, 200, 201; 702/3; 340/905, 439; 348/149; 364/443; 455/66, 422

(56) References Cited

U.S. PATENT DOCUMENTS 4,792,803 A * 12/1988 Madnick et al. ............ 340/905
5,164,904 A * 11/1992 Sumner ...................... 701/117
5,802,492 A * 9/1998 DeLorme et al. ........... 701/200
6,321,158 B1 * 11/2001 DeLorme et al. ........... 701/201
6,466,862 B1 * 10/2002 DeKock et al. ............. 701/117

OTHER PUBLICATIONS

DeKock et al., Provisional Application (60/130,399), filed Apr. 19, 1999, 21 pages and 8 figures.*

* cited by examiner

*Primary Examiner*—John Pezzlo

(57) ABSTRACT

A traffic reporting system and method utilizes wireless technology to efficiently provide traffic information specifically targeted to the user of a wireless unit, such as a cellular phone. Traffic information is detected and received, for a designated region, from a plurality of sensors. Traffic flow information within the designated region is then calculated based upon the sensed information. Finally, the traffic flow information is output to a wireless unit upon the wireless unit entering the designated region. As such, the traffic information can be effectively transmitted to the user through the wireless unit. It can be particularly targeted to the user when entering a particular designated region, such as a cell for example, to advise of heavy traffic within the region.

4 Claims, 6 Drawing Sheets

TRAFFIC REPORTING SYSTEM AND METHOD OVER WIRELESS COMMUNICATION SYSTEMS

BACKGROUND OF THE INVENTION

1. Field of the Invention

The present invention relates to wireless communication systems and more particularly to the transmission of information over wireless communication systems.

2. Description of Related Art

Wireless communication, and particularly cellular/PCS wireless communication systems, are becoming more and more popular in the U.S. More particularly, the use of wireless systems, and particularly cellular phones, is becoming more and more popular in automobiles. Many automobiles currently on the highway are equipped with cellular phones.

Although many cars on the highway are equipped with cellular phones, and these phones have many features, the phones are mainly utilized for communicating with other phones via wireless and land line phone networks. These phones are not used to receive other kinds of information, such as traffic information for example.

While on the highway, most people receive highway traffic information from AM/FM radio stations, periodically. This information is often general information corresponding to large regions and often comes to a user long after traffic has accumulated. Accordingly, a need exists for quickly and efficiently providing highway traffic information to a user, and for more particularly targeting the highway traffic information to that which is applicable to the user.

SUMMARY OF THE INVENTION

The present invention is directed to a traffic reporting system and method which utilizes wireless technology to efficiently provide traffic information specifically targeted to the user of a cellular phone. Traffic information is received for a designated region from a plurality of sensors, traffic flow information within the designated region is calculated, and the calculated traffic flow information is output to a wireless unit upon the wireless unit entering the designated region. As such, the traffic information can be effectively transmitted to the user through the wireless unit, and can be particularly targeted to the user when entering a particular designated region, such as a cell for example.

BRIEF DESCRIPTION OF THE DRAWINGS

Other aspects of the present invention will become more fully understood from the following detailed description of the invention and from the enclosed drawings, wherein like reference numerals represent like elements and wherein.

DETAILED DESCRIPTION OF THE PRESENT APPLICATION

The present application utilizes wireless systems, such as existing cellular/PCS systems, to provide traffic information to existing wireless units (cellular phones or mobile units for example) within the wireless network. In the system and method of the present application, sensors are used to detect the number and speed of cars on the highway in various designated regions, such as those defined by cells in a cellular network. The sensors transmit the information to a central processing unit, located in a mobile switching center servicing a plurality of base stations for example in a wireless network, and the central processor calculates traffic information from the transmitted information within particular designated regions corresponding to the sensors. Upon a wireless unit entering a designated region, calculated traffic flow information is then output to the wireless unit.

As such, a user in an automobile with a wireless phone has access to traffic information which is particularly useful to the user, since he is driving within the designated region. Further, the traffic information is current since it is based upon information recently detected by sensors within the designated region.

In further preferred embodiments of the present application, map information including particular locations, such as particular roads for example, is prestored at the central processing unit and is designatable- by a cellular phone user. For example, the cellular phone or wireless unit can be preprogrammed such that each of a plurality of roads within the designated region correspond to a number on the cellular phone keypad, such that the cellular phone user selects a particular number and immediately obtains traffic information for the particular location selected. The information can be audibly output or visually output to the user and can indicate, based on previously received information, whether highway conditions include relatively heavy or light amounts of traffic.

Figure 1:
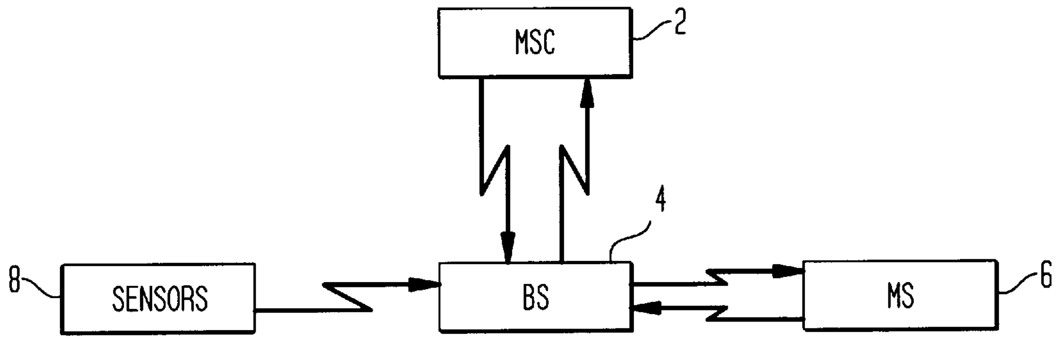
FIG. 1 is an illustration of a wireless network used in conjunction with traffic flow sensors of the present application.

FIG. 1 illustrates an overall wireless communication system used in conjunction with the present application. A system of the present application utilizes existing technology for cellular networks including protocols and other information for communicating between a wireless unit or a mobile station (MS) 6 and a base station. (BS) 4, and protocols and other information for communicating between the BS 4 and a mobile switching center (MSC) 2. Preferably, the traffic reporting system of the present invention utilizes a central processor located at MSC 2, servicing a plurality of base stations (not shown) including BS 4, for calculating traffic flow information within a plurality of designated regions such as cells serviced by the various base stations. Typically, in a wireless network, such as a cellular/PCS network for example, the MSC 2 services a plurality of base stations, each covering designated areas, known as cells, and coordinates the handing off of the information to and from the MS 6 from one base station to another.

FIG. 1 further illustrates sensors 8. These sensors extract traffic information, such as the number of cars passing by and the rate of travel or speed of the cars, determined based upon information from a plurality of sensors. The sensors 8 are preferably located along various roads in various designated regions or cells, and preferably provide sensed traffic information to corresponding base stations, such as BS 4, servicing a particular designated region.

Upon receiving the sensed information, base stations such as BS 4 for example, preferably output the sensed information to a central processing unit which is preferably located in MSC 2, wherein traffic flow information is calculated based upon the sensed information. Alternatively, the central processing unit for calculating traffic flow information can be located at an area other than MSC 2; and/or the sensors can send the sensed information directly to the central processor and thus directly to MSC 2, and/or send it directly to a central processor for calculating traffic flow information located at an area other than MSC 2. A further description of the sensors 8 is as follows. As such, the location of the central processor and the route that the sensed information takes to get to the central processor should not be considered limiting.

Figure 2A:
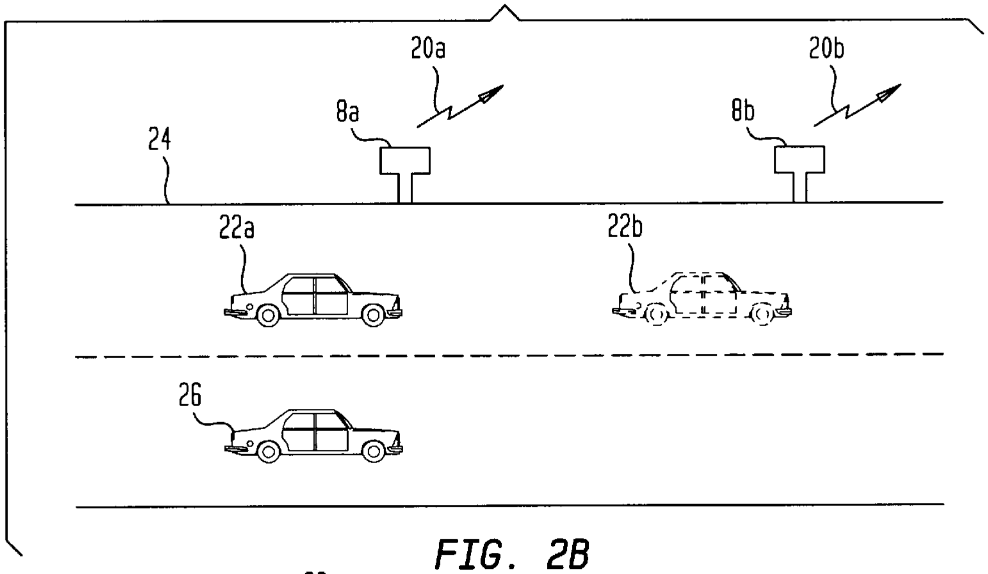
FIGS. 2*a*–2*c* illustrate sensors used in the traffic reporting system and method of the present invention.
Figure 2B:
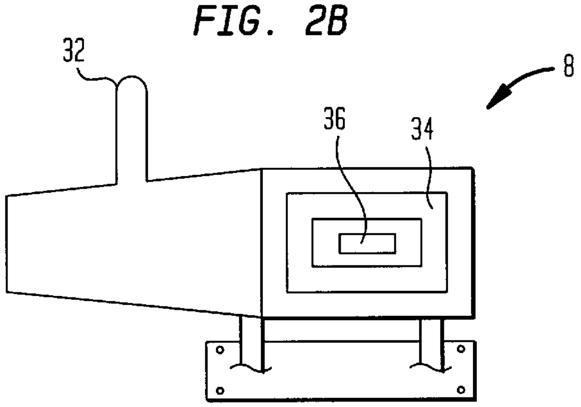
Figure 2C:
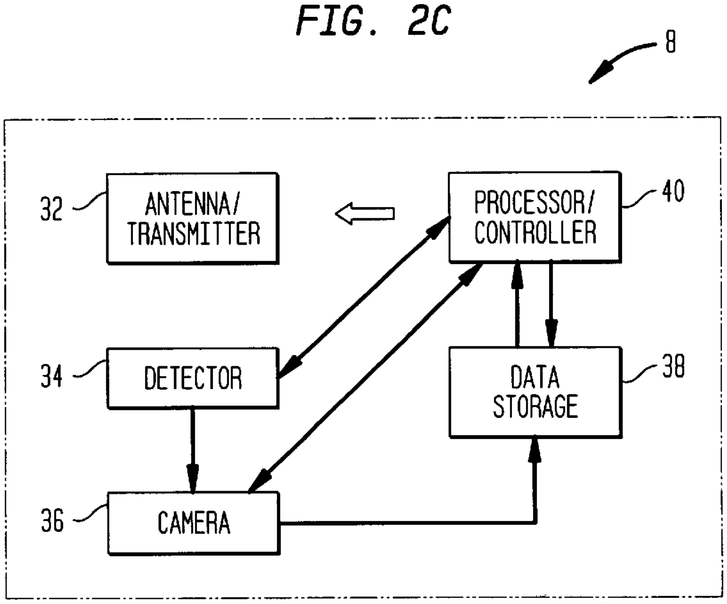

FIGS. 2*a*–2*c* illustrate an example of sensors 8 usable for the present invention. It should be noted that the sensors 8 described hereafter are merely exemplary and should not be considered limitative of the present invention. Any sensors capable of detecting a number and/or speed of cars passing by may be used.

FIG. 2*a* provides an illustration of sensors 8*a* and 8*b* located on a highway 24. Preferably, the sensors 8*a* and 8*b* are installed along the side of the highway 24 or on the top of existing highway warning or information signs in an appropriate manner, enabling the sensors to detect, capture and transmit necessary information from vehicles on the highway, such as vehicles 22*a* and 26 for example. The processing system or central processor, preferably located in MSC 2, includes defined information regarding street and location of each sensor such as sensors 8*a* and 8*b*, and receives, preferably through BS 4, time stamps and vehicle identification along with sensor name and time reported from sensors such as 8*a* and 8*b*. Operation of the sensors 8 is as follows.

Vehicle 22*a* for example initially passes by sensor 8*a*, and eventually passes by a second sensor 8*b* as shown by element 22*b*. Since the vehicle 22 passes from one sensor 8*a* to another sensor 8*b*, and since the distance between sensors 8*a* and 8*b* is known to the central processor in MSC 2, the central processor can easily calculate speed of the vehicle. The speed of the vehicle and the number of vehicles passing sensors 8*a* and 8*b* indicates the behavior of traffic or traffic flow on the highway. Further, sensors 8 sense vehicle information from multiple vehicles 22*a* and 26, thereby generating further information regarding traffic flow on a particular highway 24, and output the information 20*a* and 20*b* to BS 4, and eventually to a central processor at MSC 2.

As previously stated, the central processor at MSC 2 calculates traffic flow information including not only the number of vehicles on a particular highway 24, but also the speed of the vehicle. In an effort to illustrate the traffic flow information calculated, first assume that the car 22*a* passes a first sensor 8*a* at 1 PM. Then, the same car shown as 22*b* in FIG. 2*a*, passes sensor 8*b* at 1:20 PM. The central processor at MSC 2 knows that sensors 8*a* and 8*b* are twenty miles apart, based on prestored information. From this prestored information and from the information received from sensors 8*a* and 8*b*, illustrated as 20*a* and 20*b* in FIG. 2*a*, traffic flow information including the speed of the vehicle 22 is calculated as follows:

20 mi/20 min=1 ml/min or 60 mi/hr.

This is a very simple example but illustrates how the central processor in MSC 2 is used to calculate traffic flow information for the highways. The use of this traffic flow information will be described later.

FIG. 2*b* illustrates one configuration of the sensor 8. As previously stated, each sensor 8 can be mounted on highways throughout a designated region or cell, along the side of the road or on the top of highway warning/information signs in an appropriate manner so that they can detect, capture and transmit necessary information regarding highway traffic flow conditions. Each sensor 8 preferably includes an antenna 32 for transmitting information to base station 4 and to central processor and MSC 2; a detector 34 for sensing the presence of a vehicle; and a camera 36 for collecting information regarding the vehicle. In one preferred embodiment, the detector 34 senses the presence of a vehicle such as vehicle 22*a* shown in FIG. 2*a* for example, and initializes camera 36. As the vehicle 22*a* passes the camera 36 of sensor 8*a*, the camera takes snapshots and readings from the passing vehicle 22*a*. The technology for capturing information such as the pictures of a license plate identifying the car, or information barcodes such as that currently used for toll collecting systems for example, is presently known.

The information from the camera 36 is then stored and data collected from vehicles including the plate number or other identifying information, along with a time stamp showing the exact time the information was collected, is stored. The information is thereafter digitized, processed by a processor located within the sensor 8, and transmitted through antenna 32.

FIG. 2*c* is a block diagram of the structure of sensor 8. As shown, detector 34 essentially triggers camera 36 to capture information. This information is stored in data storage 38 and is processed in processor/controller 40. The information, such as that illustrated by 20*a* and 20*b*, is then output through antenna/transmitter 32 for eventual use in calculating traffic flow information in the central processor preferably located in MSC 2 for example.

As previously stated, traffic information is sent by sensors 8 and preferably transmitted to base station 4, and is then preferably re-transmitted to a central processor preferably located at MSC 2. Current cellular/PCS base stations can be used to receive the sensed traffic information from sensors 8. The base stations 4, when receiving this information from sensors 8, will attach heading information to the data identifying the particular base station and time stamp information. Once processed, the traffic information is then forwarded to the central processor in MSC 2 in a similar manner to that currently used by base station to send information to the MSC. The base station preferably includes a temporary storage memory location for temporarily storing sensed traffic information from sensors.

Figure 3:
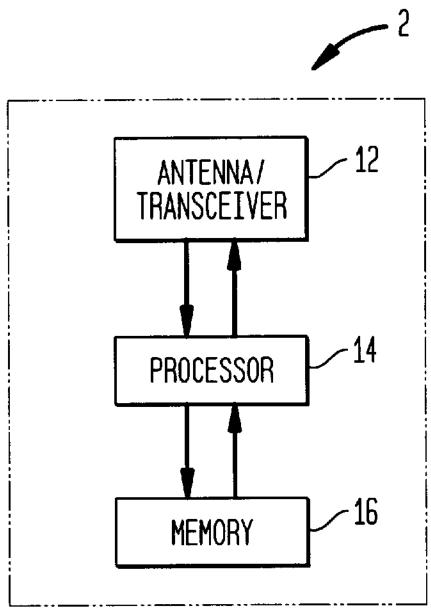
FIG. 3 illustrates processing structure of the present application located in a mobile switching center of a wireless network, for example.

FIG. 3 illustrates the processing structure located at MSC 2. The MSC 2 includes an antenna/transceiver 12 for receiving information and for sending information back to an MS 6 through BS 4. The antenna/transceiver 12 is connected to a central processor 14 which is further connected to a memory 16. The processor 14 and/or the memory 16 can be solely dedicated to the calculation of traffic flow information, or can be that previously utilized at the MSC 2 for other operations.

Preferably, the central processor 14, such as processor 14 at MSC 2, calculates traffic flow information for a plurality of designated regions, since one MSC in a standard cellular/PCS network controls a plurality of base stations governing a plurality of designated regions or cells. Each of these base stations preferably receives information from sensors 8 within its designated region, and thus the processor 14 at MSC 2 calculates traffic flow information for any of a plurality of designated regions from corresponding sensed traffic flow information from the designated region. By the system and method of the present application, the central processor 14 at the MSC 2 sends current and up to date traffic flow information to MSs such as MS 6 in a plurality of designated regions.

Figure 4:
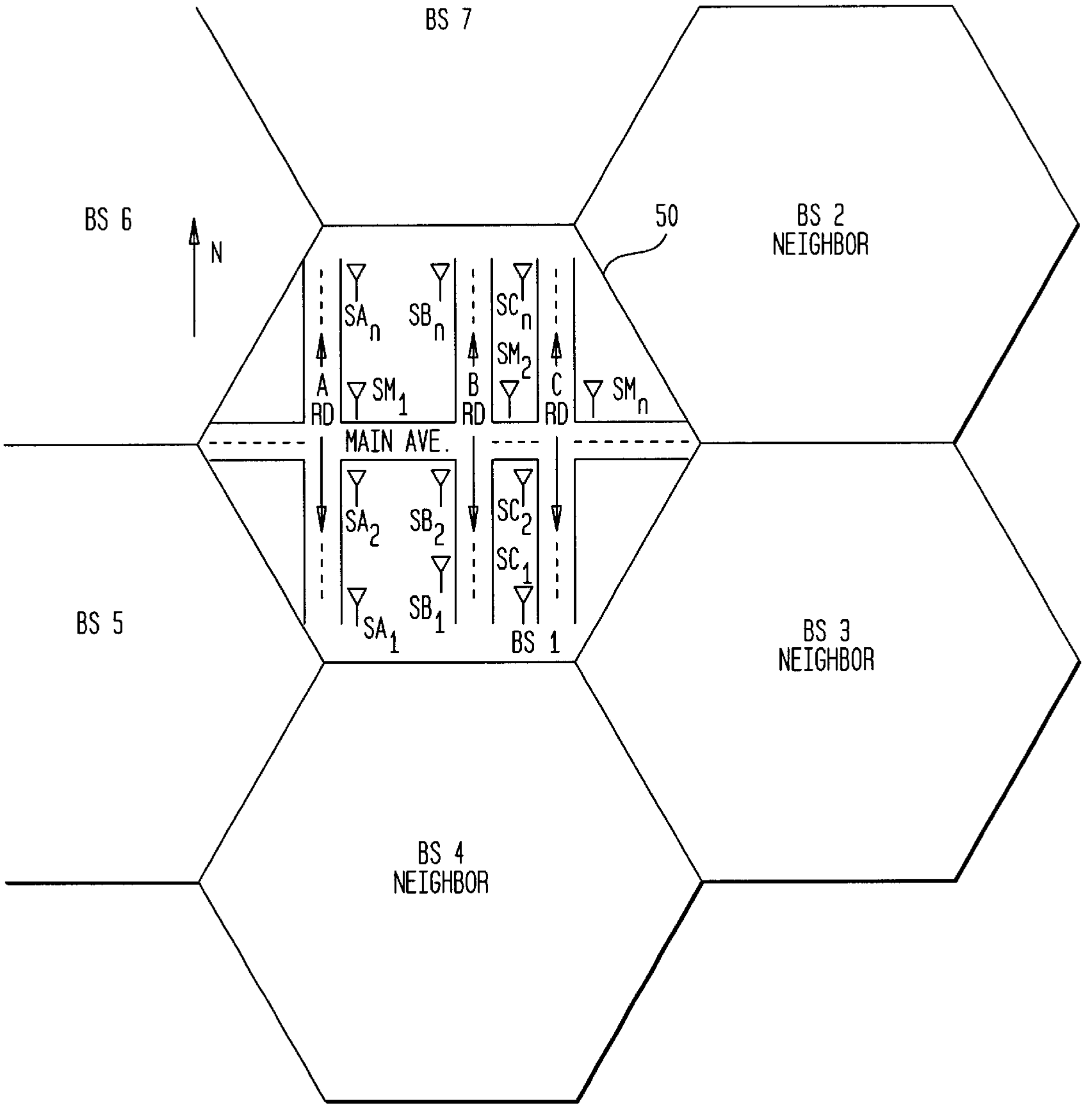
FIG. 4 is a map of an area served by an MSC.

FIG. 4 is a map of an area served by the MSC 2 and particularly shows an area 50 served by a base station, BS1. The MSC 2 serves BS1 and neighboring areas served by BS2–BS7, for example.

BS1 serves all the MSs traveling/standing on many streets in the area 50 shown in FIG. 4, the BS1 cell area. The BS1 serving this region has adjacent neighboring BSs serving the nearby neighboring areas. The MSC 2 is preprogrammed with information (stored in memory 16 for example) regarding the streets and sensors on the streets (memory mapped) to which BS1 provides service (for the MSs in the vehicles traveling/standing on the streets). The mapped relationship is described below.

Main Ave. (horizontal street) with sensors at locations Sm1, Sm2, . . . , Smn A Rd (vertical road) with sensors at locations Sa1, Sa2, . . . , San B Rd (vertical road) with sensors at locations Sb1, Sb2, . . . , Sbn C Rd (vertical road) with sensors at locations Sc1, Sc2, . . . , Scn Assuming that a vehicle K is traveling east on Main Ave from A road toward C road, the first sensor Sm1 at the intersection of the Main Ave. and A Rd detects and captures vehicle K data, and processes and then transmits the information to the BS that is serving the area, in this case BS1. BS1 then attaches heading and time stamp information and then transmits the information to the MSC 2. The MSC 2 saves this information in memory 16 for example. After a predetermined period of time, the vehicle K reaches the second sensor Sm2 and the same data capturing process is repeated and the MSC 2 receives and saves this information. In addition, speed of the vehicle is calculated in the manner described previously. This process will be performed not only for one vehicle but for many more vehicles passing through these sensors. The MSC 2 therefore stores a lot of information regarding the vehicles and their speed. The MSC 2 then determines traffic flow from the data based on the number of vehicles and vehicle speed, as follows.

Assuming that the MSC 2 computes that it took 20 minutes for vehicle K to travel on East Main Ave. between the intersection of A Rd (Sm1) and B Rd (Sm2). The MSC 2 has information stored regarding the distance between the sensors (for example, 2 miles) and thus calculates the speed of vehicle K:2 ml/20 min=1 ml/10 min or 6 ml/hr. Further, MSC 2 includes a database containing the record of the same time periods (for example) for each day of the week (for example), thus compares the new traveling time (for example 20 minutes) or speed, to the previous recorded data, such as a "normal" time of 10 minutes for example. By using some combination of the number of vehicles detected, the time of travel, the rate of speed of travel, etc., traffic flow is determined.

In this case, the travel time of 20 minutes would indicate a 10 minute delay over the "normal" time of 10 minutes. Such a time of 20 minutes would preferably be an average of, for example, the travel time of 20 cars. This average travel time is then compared to the stored information.

Accordingly, it should be clear that the sensed information can be compared to stored "normal" information in many ways to determine "traffic flow" information. Delays can then be transmitted generally when a threshold is crossed, or specifically in terms of a 10 minute delay for example. The time stamps can be used to calculate time of travel for comparison purposes; speeds can be determined and compared to determine delay; and even the number of cars can be sensed to determine delay.

For example, the sensors need not be complex and need only sense the number of cars passing thereby (without identifying which cars have passed, for example). If sensor Sm1 senses 100 cars at time "X", and it normally takes 10 minutes (at a normal speed to cover a known distance between Sm1 and Sm2) to get to Sm2, then at time "X+10 minutes", Sm2 should sense 100 cars. If Sm2 only senses 80 cars at time "X+10 minutes", then there is a delay and this can be sent to the MS. Even further, if it takes until time "X+20 minutes" before Sm2 senses 100 cars, then a delay of 10 minutes (X+10)–(X+20)=–10, can be sent to the MS.

Still further, "normal flow" is determined and stored as threshold information for comparison purposes. Depending on desired results "normal flow" thresholds can be stored for different days of the week (Monday "norms", Friday "norms", mid-week "norms"), for different seasons (Winter "norms", Summer "norms"), etc. including any combination thereof. Further, these thresholds can be re-determined on an on-going basis and can be adjusted when the traffic flow varies by a predetermined amount on a consistent basis, for example. For example, if traffic flow is 10% above the threshold for thirty days, then the threshold can be adjusted if desired. Alternatively, the stored information need not be thresholds, and can be actual amounts to allow for calculation and transmission of actual estimated delay times as explained above.

The MSC 2 performs traffic flow calculations periodically depending on the demand of the information. The decision of the traffic flow calculation is made by the MS 2 administration and depends on how fast the people in and out of that area need this information. The traffic flow calculation process is performed in a similar manner as described above for many sensors in different regions. The MSC 2 uses known (stored) street or exit names to report any unusual delays.

In the above example, the report transmitted by the MSC 2, through BS1 to the MS, states that the traffic on Main Ave. between intersection of A Rd and B Rd is not normal (a 10 minute delay is estimated). In addition, if desired, traffic flow information regarding both normal and abnormal flow can be output periodically. The reported traffic flow, based upon sensed information being below a predetermined threshold by a certain amount (a); being within a predetermined range of the threshold (b); and being above the threshold by a certain amount (c), may include the following:

(a) Light traffic (with "X" minutes of estimated early arrival, if desired)

(b) Normal average travel time (c) Heavy traffic (with "X" minutes of estimated delay, if desired)

More preferably delay times or early arrival times are calculated and transmitted to the MS based upon the amount that the sensed information is above or below the threshold. As these calculations would be apparent to those of ordinary skill based on the information presented, no further discussion will be given.

The predetermined thresholds used for comparison to the continuously calculated traffic flow information are based on average statistical numbers, derived from previously decided information (when the system is still new) or previously recorded information. The traffic flow reporting thresholds should not be limited to the ones described above and depend on the need to convey information to the public receiving the information in a particular region.

Figure 5:
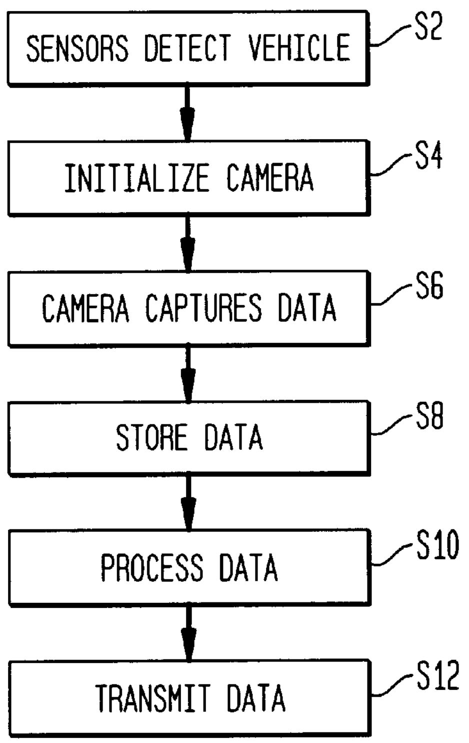
FIGS. 5 and 5*a* are flowcharts regarding the traffic reporting method of the present application from the perspective of the operation of the sensors and a base station.

FIG. 5 illustrates the operation of the sensor 8 as shown in FIGS. 2*a*–2*c*. In Step S2, the sensor, preferably the detector 34, senses the presence of a vehicle such as vehicle 22*a* in FIG. 2*a*. Thereafter, in Step S4, the camera 36 of sensor 8 is initialized. The camera 36 then captures traffic information such as a vehicle identifying information including a license plate number or identifying barcode for example, and stores this captured or sensed traffic information data in Step S8. The information is then preferably processed in Step. S10 to digitize the traffic information data and time stamp collected. The data is then transmitted in Step S12 to the processor at MSC 2, preferably through BS 4.

Figure 5A:
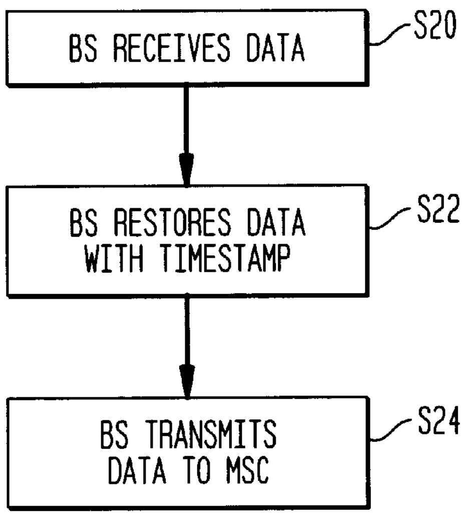

FIG. 5*a* illustrates the process by which the data is received and eventually transmitted at BS 4. Preferably, the base station, such as BS 4, receives the transmitted data from sensor 8 within its particular designated region in Step S20. Thereafter, in Step S22, the BS attaches heading information identifying the BS and restores the data with its time stamp. Finally, in Step S24, the BS transmits the data to the central processor at MSC 2.

Figure 6:
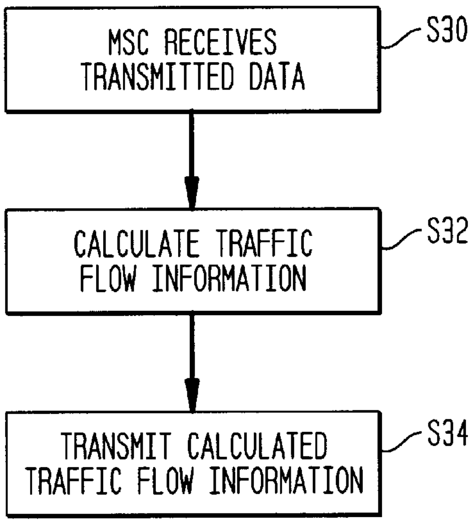
FIGS. 6 and 6*a* are flowcharts regarding a first preferred embodiment of the traffic reporting methodology of the present application.

In a first preferred embodiment, the processor at MSC 2 broadcasts general highway traffic warnings to MSs within a particular designated region or on a particular highway to provide them with specific useful information. For example, the broadcast message could be the warning of abnormally heavy traffic due to an accident that just took place on a particular street or within a particular designated region for example, or it could be about a warning of abnormally slow traffic due to a street or lane closing for example. This method, in this preferred embodiment, is described as follows with regard to FIGS. 6 and 6*a*.

Figure 6A:
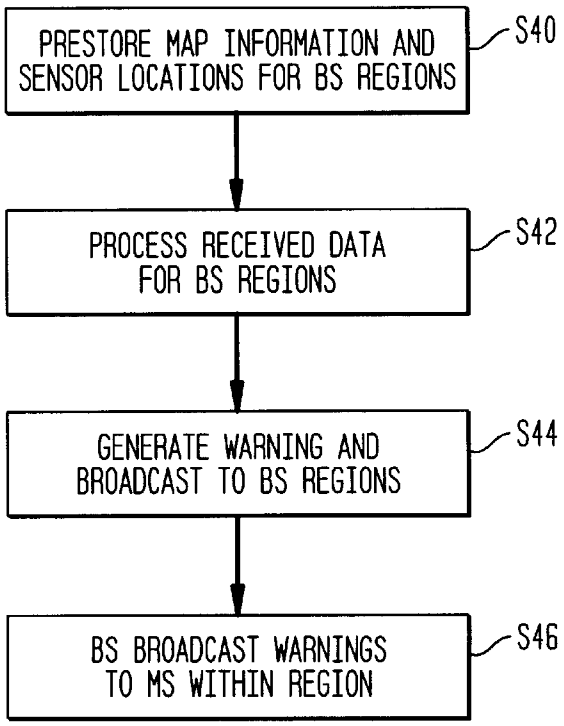

As shown in FIG. 6*a*, the central processor at MSC 2 initially receives sensed traffic information data from BS 4 at Step S30. Traffic flow information is calculated for the designated region corresponding to BS 4 in Step S32 in the manner previously described. Thereafter, calculated traffic flow information is transmitted to the MS upon the MS entering a designated region in Step S34. Since information regarding an MS being within control of a BS is known, calculated traffic flow information can easily be output to all MSs within the BS region.

More specifically, in this broadcasting mode of one preferred embodiment of the present application, previously received sensed traffic information for the designated region is stored and the newly received data or sensed traffic information is compared to the previously stored traffic information during calculation of the traffic flow information in Step S32. Even more preferably, the previously received sensed traffic information for the designated region is used to create a predetermined threshold, above which a traffic highway warning will be broadcast to all MSs on a particular highway or to MSs within a particular region, indicating that traffic on a particular highway within the region is relatively heavy. The received sensed traffic information is then compared to this established threshold to determine whether or not traffic is relatively heavy and if so, traffic flow information such as that indicating that a particular road within the designated region is relatively congested, is output. FIG. 6*a* generally describes such a process.

Initially, map information and sensor location information for each of the BS regions serviced by MSC 2, similar to that shown in FIG. 4 for example, is stored in Step S40. Received sensed traffic information, received for the various BS regions, is then processed. For each of these regions, previously received traffic information is used to determine a threshold at which traffic flow on various roads within the designated region is high. Received current traffic information is then compared to these thresholds for each of the various regions and warnings are generated and broadcast to base stations within designated regions in Step S44, when such relatively heavy traffic conditions are determined. Thereafter, in Step S46, the BS broadcast the determined traffic flow information, such as warnings, to the MS within the region. This can occur upon the MS entering the particular region and/or upon the MS being within the region when traffic flow crosses the "heavy traffic" threshold, for example. As such, the MS will be made aware of any particular heavy traffic locations. In a further preferred embodiment, this traffic flow information is updated periodically, and periodically outputted to the MS within the designated region.

The general broadcast reports are traffic flow reports sent by the MSC 2 to particular areas through the BSs serving the area. The processes in which these reports are generated have been described previously. The reports are, in one preferred embodiment, preferably sent by the MSC 2 to the MSs in a targeted area about the traffic flow in the surrounding and near roads.

In the example discussed previously, after the MSC 2 calculates the average time of traffic travel on Main Ave. between A Rd. and B Rd., if it finds that it is taking 10 minutes longer than the average daily travel for the same period of time for example, then the MSC 2 sends a broadcast report to warn all of the MSs in and near that area about the 10 minute traffic delay taking place on the Main Ave. between A Rd and B. Rd. This broadcast message can go to the BS serving in that specific area and neighboring BSs.

Neighboring BSs may be limited to small numbers (about 1–10), but can be increased to add additional areas. In other words, for a particular road there may be far away regions that may need to know about its traffic warning. Good examples for these are the tunnels and bridges. The tunnel and bridge traffic flow broadcast reports can therefore be extended to far away regions. This means that the broadcast reports will be sent to all MSs within the region and to all MSs within regions of neighboring BSs. Cells are generally 2 miles in length, and thus the report could extend 20 miles out covering 10 cells, for example. The serving and neighboring BSs then pass the reports to the MSs already in the region, as well as to the MSs in the neighboring area that may be traveling toward the warned road (to even further neighbors).

The MSC 2 processes and generates traffic follow reports continuously. Therefore decisions are preferably made based on the frequency of travel and priority of the roads, for example. Thus, it should be understood that some roads may require more data calculations than other.

In another preferred embodiment, the receipt of broadcast traffic information will preferably be an option selected by a mobile phone user from its carrier. Even more preferably, even when the MS has subscribed to receive the broadcast option, it can be selectable by turning ON/OFF a switch or sending a signal from the MS to the BS and MSC 2 to "TURN ON" the option (by selecting a key, symbol, or combination thereof for example) and enable receipt of a traffic flow broadcast information. Once the MS enters a region (cell) and has the option selected, broadcast reports can be sent. Further, if within the cell and the option selected, the traffic flow information can be sent when a threshold is crossed (or can be reported automatically in the case of light, normal, and heavy traffic flow reports).

Figure 7:
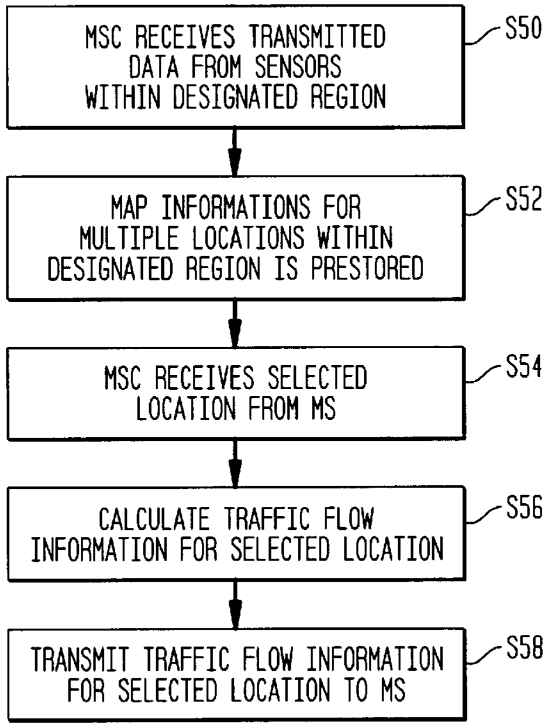
FIGS. 7 and 7*a* are flowcharts regarding the methodology of a second preferred embodiment of the present application.
Figure 7A:
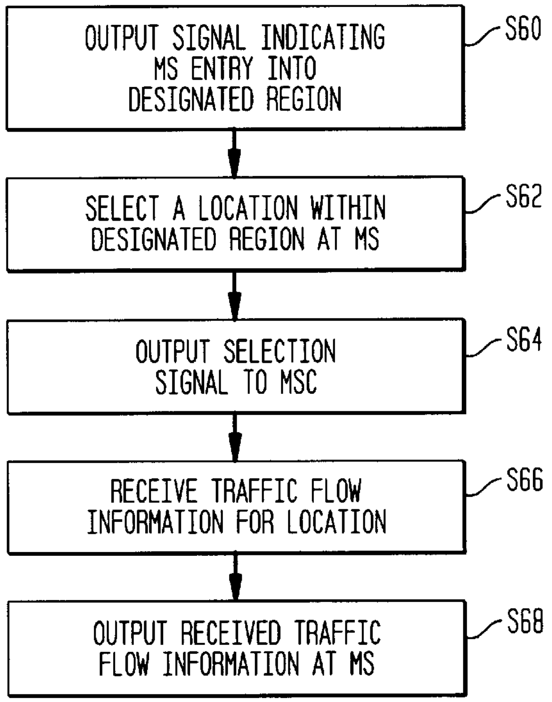

FIGS. 7*a* and 7*b* illustrate another preferred embodiment of the present application wherein the MS receives traffic flow information for a particular location or road within a designated region. Similar to that previously described, the MSC 2 initially receives transmitted data and sends traffic information from sensors 8 within a designated region in Step S50 of FIG. 7. In Step S52, however, not only are map information and sensor location information for various BS regions prestored, but information regarding various multiple locations or multiple highways is also prestored. For example, if four main roads exist within a particular designated region, each of these four roads is prestored so as to correspond to a numerical number, such as 1–4 for example. Thereafter, in Step S54, the processor at MSC 2 receives a selection signal corresponding to a selected location, by the user pressing the number 4 for example, within the designated region from the MS. In response thereto, in Step S56, the processor at MSC 4 calculates traffic flow information, not just for the designated region, but specifically for the particular road selected or location selected by the MS within the particular designated region. Finally, in Step S58, this traffic flow information for the selected location within the designated region is output to the MS. Again, depending upon how the system is configured for processing at the MSC 2, the traffic flow information can indicate that a delay is present; can indicate a delay in minutes; and/or can report the flow as being light, normal, or heavy as described previously. In addition, in a further preferred embodiment, the traffic flow information is calculated and output periodically to the MS.

It should be noted that traffic flow information for each of the plurality of locations within a designated region can be calculated in a step prior to Step S54, and thereafter when a selected location is received from an MS, the MSC 2 merely outputs or transmits the traffic flow information for the selected location to the MS in Step S58. In other words, the processes for Steps S54 and S56 can be reversed.

In addition, it should be noted that the MSC 2 can calculate information for multiple locations within a plurality of designated regions, or within a single designated region after receiving transmitted data from sensors within the designated region. The order of this calculation will depend upon the processing speed of the processor at MSC 2, for example.

FIG. 7*a* provides a further description of the second embodiment of the present application, from the standpoint of the MS. Initially, in Step S60, a signal is output indicating that the MS has entered a designated region, and/or the MSC/BS otherwise detects that the MS has entered the designated region in a known manner. Upon entering the designated region (or anything within the region), in Step S62, the MS then selects a location within the designated region by a user hitting one of the buttons 1 to 4 for example. This selected location is then output to the MSC 2 in Step S64. After traffic flow information for the selected location is calculated at the central processor within the MSC 2, this traffic flow information for the designated location is received at the MS in Step S66. Finally, in Step S68, the traffic flow information is output at the MS to the user by visually displaying the information or audibly displaying the information, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

For example, the threshold based on previously received sensed traffic information for a designated region cannot only be determined, but can also be varied based on varying sensed traffic information. For example, in year 1, 50 cars sensed every 10 minutes might be a heavy traffic flow on a particular road. However, over the years, traffic flow might increase such that 50 cars indicates a relatively light traffic flow. If so then the threshold for determining whether or not traffic flow is heavy can be adjusted in the central processor of MSC 2, based on varying previously received sensed information.

In addition, as previously stated, sensed traffic information can be received for a plurality of designated regions, calculated for each of the plurality of designated regions, and respective calculated traffic flow information can be output to a wireless unit upon entering a respective one of the plurality of designated regions.

I claim:

1. A traffic reporting method, comprising:

receiving sensed traffic information for a designated region;

calculating traffic flow information within the designated region from the received sensed traffic information; and outputting the calculated traffic flow information to a wireless unit within the designated region, wherein the step of calculating includes comparing the received sensed traffic information to a predetermined threshold, wherein the threshold is predetermined based on previously received sensed traffic information for the designated region, and wherein the threshold is varied based on varying previously received sensed traffic information.

2. A traffic reporting method, comprising:

receiving sensed traffic information for a designated region;

calculating traffic flow information within the designated region from the received sensed traffic information;

outputting the calculated traffic flow information to a wireless unit within the designated region;

storing previously received sensed traffic information for the designated region; and comparing received sensed traffic information to previously stored traffic information during calculation of the traffic flow information, wherein the calculated traffic flow information includes a delay time length, and wherein the calculated traffic flow information includes a time of estimated early arrival.

3. A traffic reporting system, comprising:

a plurality of sensors adapted to sense traffic information in a designated region; and a processor adapted to calculate traffic flow information within the designated region from the sensed traffic information and adapted to output the calculated traffic flow information to a wireless unit within the designated region, wherein the processor includes a processing unit adapted to calculate and output the traffic flow information and a memory, adapted to store previously sensed traffic information for the designated region, wherein the processing unit is adapted to compare the sensed traffic information to the stored previously sensed traffic information during calculation of the traffic flow information, wherein the processing unit is adapted to create a threshold from the stored previously sensed traffic information for the designated region and is adapted to compare the sensed traffic information to the threshold during calculation of the traffic flow information, and wherein the processing unit is adapted to vary the threshold based on varying previously sensed traffic information.

4. A traffic reporting system, comprising:

a plurality of sensors adapted to sense traffic information in a designated region; and a processor adapted to calculate traffic flow information within the designated region from the sensed traffic information and adapted to output the calculated traffic flow information to a wireless unit within the designated region, wherein the calculated traffic flow information includes a delay time length, and wherein the calculated traffic flow information includes a time of estimated early arrival.

* * * * *